US007614949B2

(12) United States Patent
Anderson et al.

(10) Patent No.: US 7,614,949 B2
(45) Date of Patent: Nov. 10, 2009

(54) GAMING MACHINE WITH SYNCHRONIZED DISPLAY FEATURE

(75) Inventors: Peter R. Anderson, Chicago, IL (US); Joel R. Jaffe, Evanston, IL (US)

(73) Assignee: WMS Gaming Inc., Waukegan, IL (US)

( * ) Notice: Subject to any disclaimer, the term of this patent is extended or adjusted under 35 U.S.C. 154(b) by 505 days.

(21) Appl. No.: 10/205,718

(22) Filed: Jul. 26, 2002

(65) Prior Publication Data

US 2004/0018868 A1 Jan. 29, 2004

(51) Int. Cl.
*A63F 13/00* (2006.01)

(52) U.S. Cl. ............................ 463/20; 463/16; 463/25; 273/138.2

(58) Field of Classification Search .................. 463/16, 463/20, 25; 273/138.2
See application file for complete search history.

(56) References Cited

U.S. PATENT DOCUMENTS 4,695,053 A * 9/1987 Vazquez et al. ............... 463/18
5,152,529 A * 10/1992 Okada ......................... 463/20
5,393,057 A * 2/1995 Marnell, II ................... 463/13
5,395,111 A * 3/1995 Inoue ..................... 273/143 R
5,722,891 A * 3/1998 Inoue .......................... 463/20
5,752,881 A * 5/1998 Inoue .......................... 463/20
5,788,573 A 8/1998 Baerlocher et al. ............ 463/16
5,823,874 A 10/1998 Adams ........................ 463/17
5,833,537 A * 11/1998 Barrie ......................... 463/21
5,848,932 A * 12/1998 Adams ........................ 463/20
5,971,849 A * 10/1999 Falciglia ...................... 463/16
6,012,982 A * 1/2000 Piechowiak et al. ........... 463/16
6,033,307 A * 3/2000 Vancura ....................... 463/20
6,056,642 A * 5/2000 Bennett ....................... 463/20
6,059,289 A * 5/2000 Vancura .................. 273/143 R
6,105,962 A * 8/2000 Malavazos et al. ...... 273/143 R
6,302,790 B1 * 10/2001 Brossard ...................... 463/20
6,315,666 B1 * 11/2001 Mastera et al. ................ 463/31
6,328,649 B1 * 12/2001 Randall et al. ................ 463/20
6,336,863 B1 1/2002 Baerlocher et al. ............ 463/27
6,368,216 B1 * 4/2002 Hedrick et al. ................ 463/20
6,533,273 B2 * 3/2003 Cole et al. ............... 273/138.1
6,634,945 B2 * 10/2003 Glavich et al. ................ 463/25
6,645,073 B2 * 11/2003 Lemay et al. ................. 463/20
6,705,944 B2 * 3/2004 Luciano ....................... 463/20
6,780,109 B2 * 8/2004 Kaminkow .................. 463/20
6,793,578 B2 * 9/2004 Luccesi et al. ................ 463/20
6,832,957 B2 * 12/2004 Falconer ...................... 463/20
6,837,788 B2 * 1/2005 Cannon ....................... 463/16
6,855,052 B2 * 2/2005 Weiss et al. ................... 463/16
6,902,479 B1 * 6/2005 D'Avanzo .................... 463/18
6,964,416 B2 * 11/2005 McClintic et al. ........... 273/273
7,004,836 B2 * 2/2006 Kaminkow et al. ........... 463/20
7,014,560 B2 * 3/2006 Glavich et al. ................ 463/20
7,115,033 B1 * 10/2006 Timperley .................... 463/20

(Continued)

*Primary Examiner*—Peter DungBa Vo
*Assistant Examiner*—William H McCulloch
(74) *Attorney, Agent, or Firm*—Nixon Peabody LLP

(57) ABSTRACT

A gaming machine for conducting a wagering game includes a reel spinning display and a secondary display. The reel spinning display includes a plurality of symbol-bearing reels. The reel spinning display successively stops rotation of the reels to display the symbols on each reel in visual association with a display area. As each reel is stopped, the secondary display depicts a respective game outcome such as a bonus amount awarded to a player.

20 Claims, 7 Drawing Sheets

U.S. PATENT DOCUMENTS

| | | | | |
|---|---|---|---|---|
| 7,204,754 | B2 * | 4/2007 | Gray et al. | 463/16 |
| 7,210,997 | B2 * | 5/2007 | Hughs-Baird et al. | 463/20 |
| 7,226,358 | B2 * | 6/2007 | Miller et al. | 463/20 |
| 7,341,520 | B2 * | 3/2008 | Mattice et al. | 463/31 |
| 7,435,175 | B2 * | 10/2008 | Fiden | 463/20 |
| 7,503,848 | B2 * | 3/2009 | Berman et al. | 463/20 |
| 7,510,475 | B2 * | 3/2009 | Loose et al. | 463/31 |
| 2001/0055989 | A1 * | 12/2001 | Thomas | 463/16 |
| 2002/0193158 | A1 * | 12/2002 | Weiss et al. | 463/16 |
| 2003/0036418 | A1 * | 2/2003 | Seelig et al. | 463/16 |
| 2003/0054872 | A1 * | 3/2003 | Locke et al. | 463/20 |
| 2003/0064790 | A1 * | 4/2003 | Hughs-Baird et al. | 463/20 |
| 2004/0018868 | A1 * | 1/2004 | Anderson et al. | 463/20 |
| 2004/0192436 | A1 * | 9/2004 | Seelig et al. | 463/25 |
| 2008/0248860 | A1 * | 10/2008 | Seelig et al. | 463/20 |

* cited by examiner

GAMING MACHINE WITH SYNCHRONIZED DISPLAY FEATURE

FIELD OF THE INVENTION

The present invention relates generally to gaming machines and, more particularly, to a gaming machine including a synchronized display feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

To enhance the entertainment value of a gaming machine, gaming machines often include features such as an enhanced payoff and a "secondary" or "bonus" game which may be played in conjunction with a "basic" game. The bonus game may comprise any type of game, either similar to or completely different from the basic game, which is entered upon the occurrence of a selected event or outcome of the basic game. Generally, the features provide a greater expectation of winning than the basic game.

To attract players, more attractive or unusual video displays, mechanical/physical displays, and/or audio accompany the basic and bonus games. The fanciful and visually appealing displays offer tremendous advantages in player appeal and excitement relative to other known games. Additionally, such games are attractive to both players and operators. Thus, there is a continuing need to develop new features for the displays and the basic and bonus games to satisfy the demands of players and operators. Preferably, such new features will maintain, or even further enhance, the level of player excitement. The present invention is directed to satisfying these needs.

SUMMARY OF THE INVENTION

A gaming machine for conducting a wagering game includes a reel spinning display and a secondary display. The reel spinning display includes a plurality of symbol-bearing reels. The reel spinning display successively stops rotation of the reels to display the symbols on each reel in visual association with a display area. In accordance with the present invention, as each reel is stopped, the secondary display depicts a respective game outcome such as a bonus amount awarded to a player.

BRIEF DESCRIPTION OF THE DRAWINGS

The foregoing and other advantages of the invention will become apparent upon reading the following detailed description and upon reference to the drawings in which.

Figure 1:
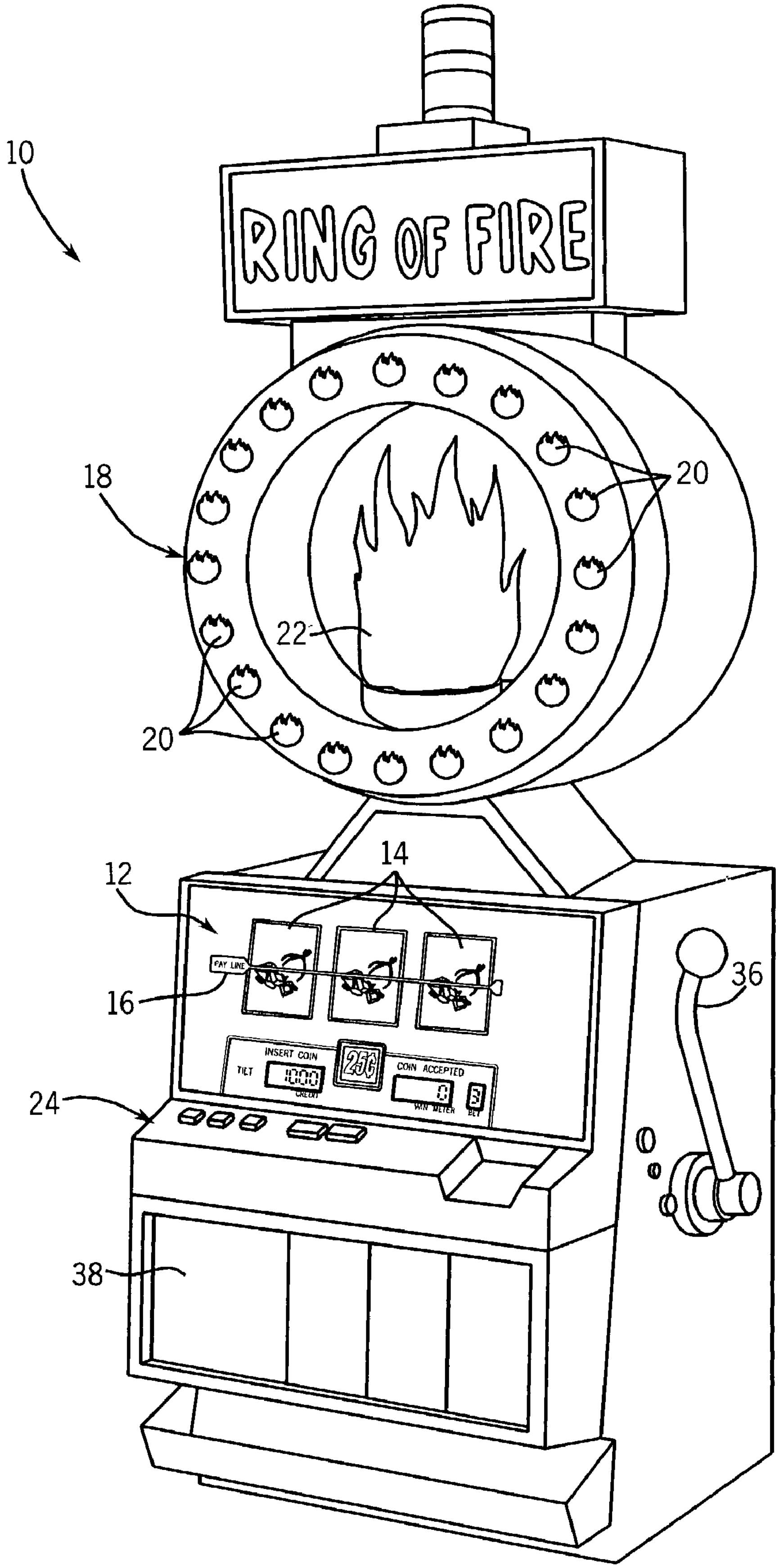
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings, FIG. 1 depicts a gaming machine 10 operable to conduct a slot-based wagering game. In operation, the gaming machine receives a wager from a player to purchase a "play" of the game. In a "play" of the game, the gaming machine generates at least one random event using a random number generator (RNG) and provides an award to the player for a winning outcome of the random event. To portray the random event to the player, the gaming machine includes a mechanical or video reel spinning display 12. The reel spinning display 12 includes a plurality of symbol-bearing reels 14 that are rotated and stopped to place symbols on the reels 14 in visual association with at least one pay line 16.

In addition to the reel spinning display 12, the gaming machine 10 includes a secondary display 18 having a ring of possible bonus amounts 20. The bonus amounts are preferably printed on glass and selectively illuminated by lamps behind the glass. The bonus amounts 20 range from a minimum amount such as five credits to a maximum amount such as one thousand credits. To reflect the fire theme of the illustrated gaming machine 10, the ring of bonus amounts 20 may surround an artificial "flame" 22. The flame 22 may, for example, be simulated with a piece of cloth that is secured at its lower end, illuminated by a yellow/orange light, and blown upwardly by a small fan. The bonus amounts 20 may be arranged in a ring as illustrated or in some other formation such as square, polygon, trail, or a vertical or horizontal ladder. In an alternative embodiment, the secondary display 18 is a video display depicting both the possible bonus amounts 20 and the flame 22.

Any video display employed in the gaming machine 10 may be implemented with a CRT, LCD, plasma, or other type of video display known in the art. The reel spinning display 12, especially if implemented in video, may be overlaid with a touch screen to facilitate interaction with the player. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
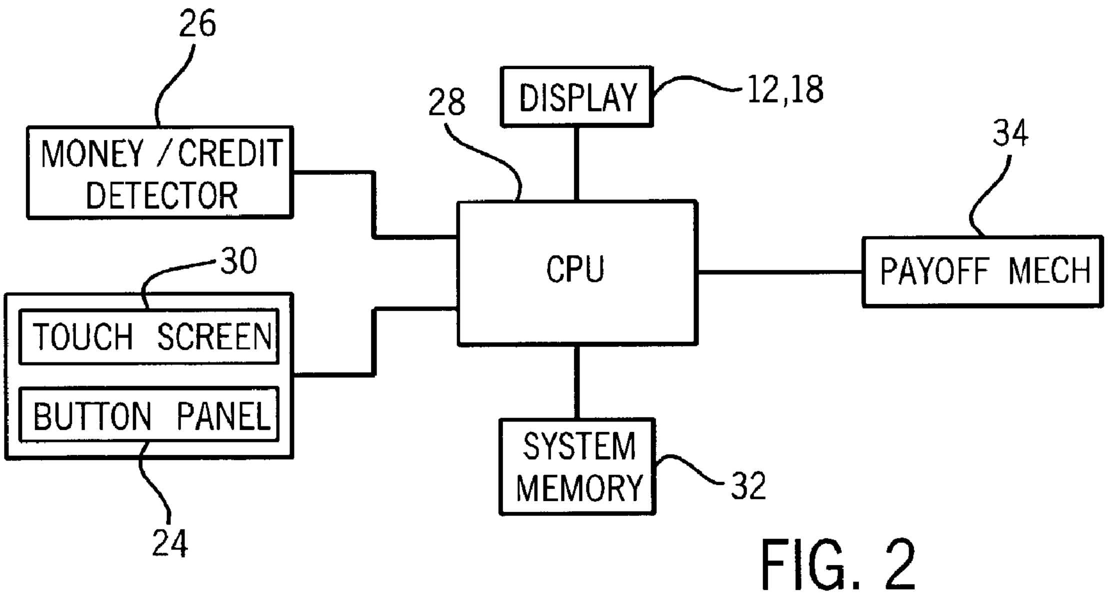
FIG. 2 is a block diagram of a control system suitable for operating the gaming machine.

FIG. 2 is a block diagram of a control system suitable for operating the gaming machine. Money/credit detector 26 signals a central processing unit (CPU) 28 when a player has inserted money or played a number of credits. The money may be provided by coins, bills, tickets, coupons, cards, etc. Using a button panel 24 (see FIG. 1) or a touch screen 30, the player may select any variables associated with the slot-based wagering game (e.g., number of pay lines if more than one can be selected) and place his/her wager to purchase a play of the game. In a play of the game, the CPU 28 generates at least one random event using a random number generator (RNG) and provides an award to the player for a winning outcome of the random event. The CPU 28 operates the spinning reel display 12 and the secondary display 18 to represent the random event(s) and outcome(s) in a visual form that can be understood by the player. In addition to the CPU 28, the control system may include one or more additional slave control units for operating one or more of the displays 12 and 18.

A system memory 32 stores control software, operational instructions and data associated with the gaming machine. In one embodiment, the system memory 32 comprises a separate read-only memory (ROM) and battery-backed random-access memory (RAM). However, it will be appreciated that the system memory 32 may be implemented on any of several alternative types of memory structures or may be implemented on a single memory structure. A payoff mechanism 34 is operable in response to instructions from the CPU 28 to award a payoff to the player. The payoff may, for example, be in the form of a number of credits. The number of credits are determined by one or more math tables stored in the system memory 32.

Figure 3:
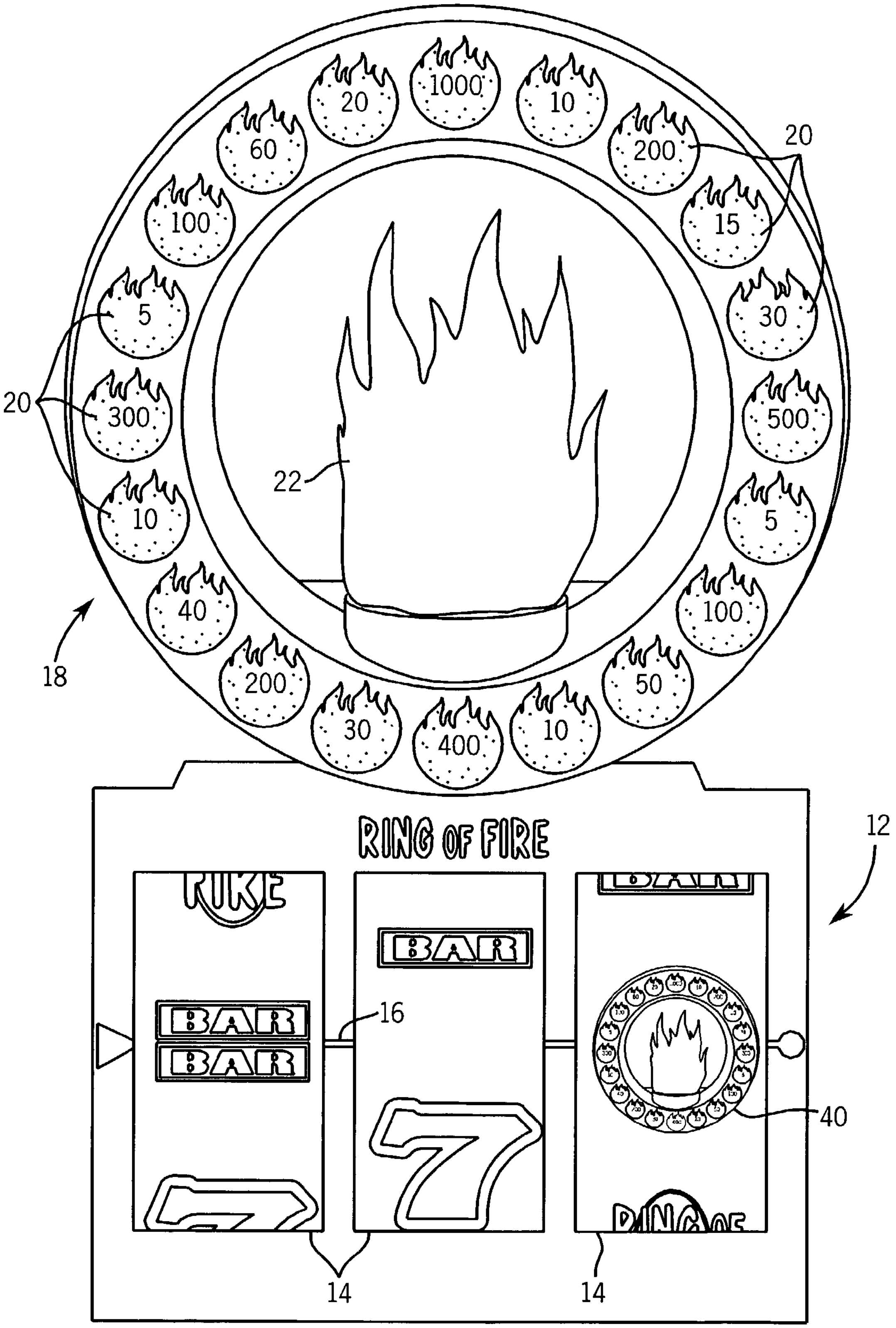
FIG. 3 is a front view of the gaming machine conducting a basic slot game on a reel spinning display, wherein the reel spinning display depicts a symbol combination for triggering a synchronized display feature.

The slot-based wagering game including a basic reel slot game and a synchronized display feature. The synchronized display feature is triggered by a start-bonus outcome in the basic slot game. Referring to FIG. 3, to play the basic slot game, a player places a wager using a "bet one" key or a "max bet" key on the button panel 24 (see FIG. 1). In response to pressing the "max bet" key, or a "spin reels" key for a wager less than the maximum, the CPU spins and randomly stops the plurality of symbol-bearing reels 14 to place symbols on the reels 14 in visual association with at least one pay line 16. Other mechanisms, such as a handle 36 (see FIG. 1), may be used to set the reels 14 in motion. Additional pay lines may be provided, in which case the player is allowed to wager on more than one pay line. The number of illustrated reels is three but a different number of reels may be provided if desired. The display 12 on which the reels are implemented may be mechanical or video. If the display 12 is mechanical, the reels are physical and rotatably driven by stepper motors. If, however, the display 12 is video, the reels are simulated with moving graphics.

The CPU uses a random number generator to select a game outcome (e.g., "basic" game outcome) corresponding to a particular set of reel "stop positions." The CPU then causes each of the reels 14 to stop at the appropriate stop position. Symbols are displayed on the reels 14 to graphically illustrate the reel stop positions and indicate whether the stop positions of the reels 14 represent a winning game outcome.

Winning basic game outcomes (e.g., symbol combinations resulting in payment of coins or credits) are identifiable to the player by a pay table 38 (see FIG. 1). The pay table 38 may be printed on glass mounted to the machine. A winning basic game outcome occurs when the symbols appearing on the reels 14 along the pay line 16 correspond to one of the winning combinations on the pay table. A winning combination, for example, could be three or more matching symbols along the pay line 16, where the award is greater as the number of matching, symbols along the pay line 16 increases. If the displayed symbols stop in a winning combination, the game credits the player an amount corresponding to the award in the pay table for that combination multiplied by the number of wagered credits. The player may collect the amount of accumulated credits by pressing a "Collect" key on the button panel 24.

Included among the plurality of basic game outcomes is a start-bonus outcome for triggering play of a synchronized display feature. A start-bonus outcome may be defined in any number of ways. For example, a start-bonus outcome may occur when a special start-bonus symbol or a special combination of symbols appears on one or more of the reels 14. The start-bonus outcome may require the combination of symbols to appear along the pay line 16, or may alternatively require that the combination of symbols appear anywhere on the display regardless of whether the symbols are along the pay line 16. The appearance of the start-bonus outcome causes the CPU to shift operation from the basic slot game to the synchronized display feature. In the illustrated example, the start-bonus outcome consists of a RING OF FIRE symbol 40 along the pay line 16.

Figure 4:
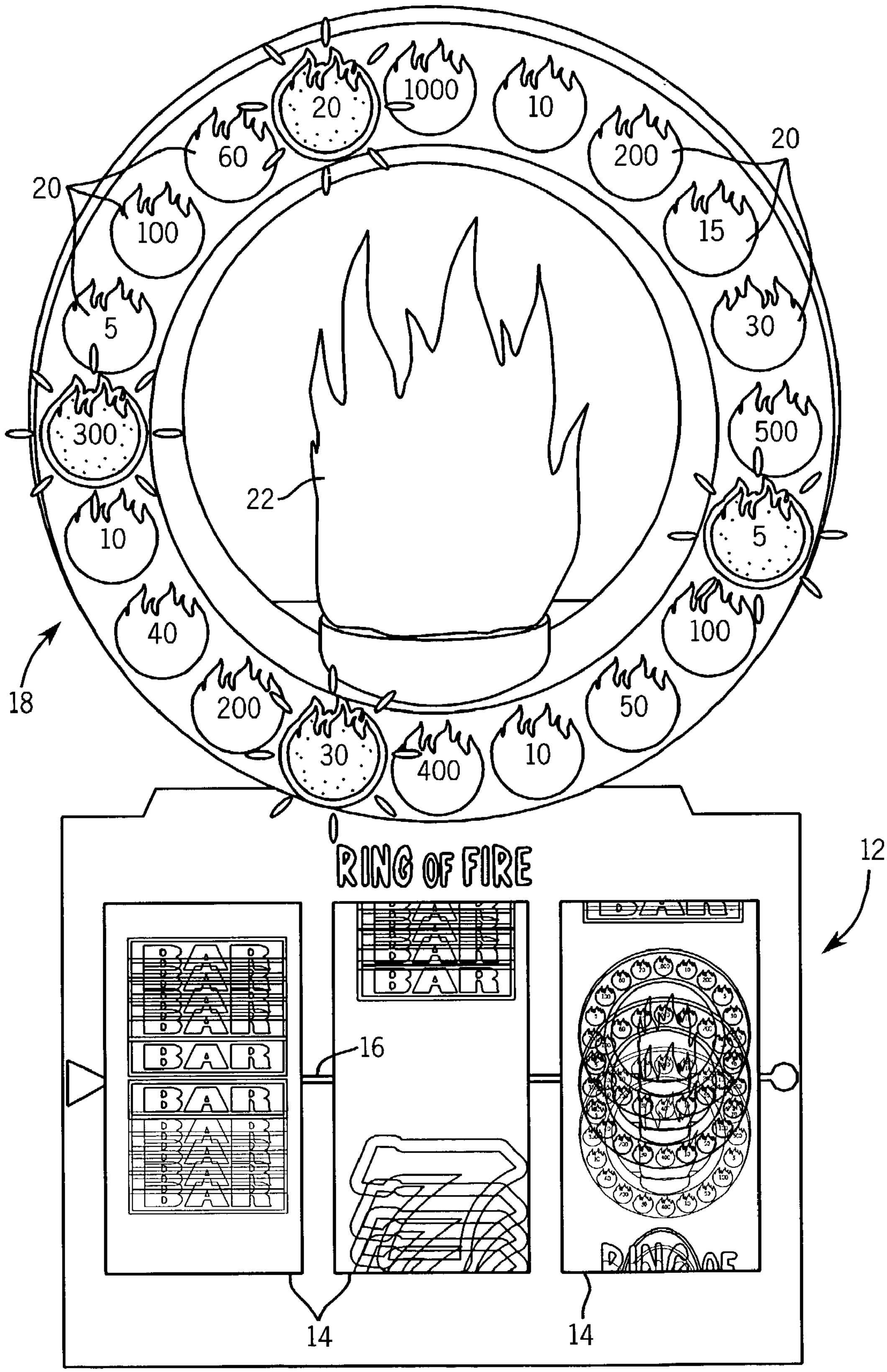
FIGS. 4 through 7 are front views of the gaming machine conducting the synchronized display feature.
Figure 5:
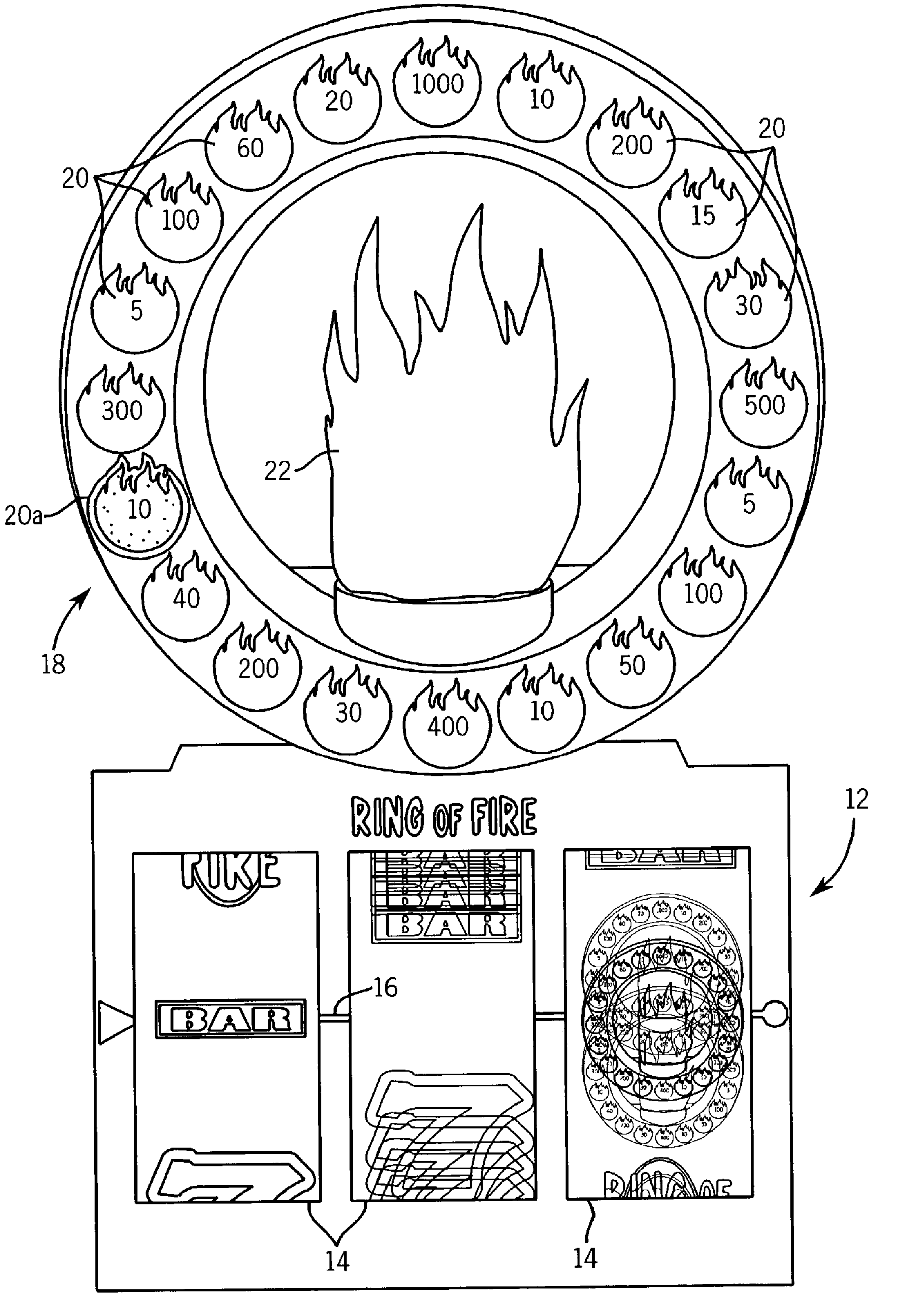
Figure 6:
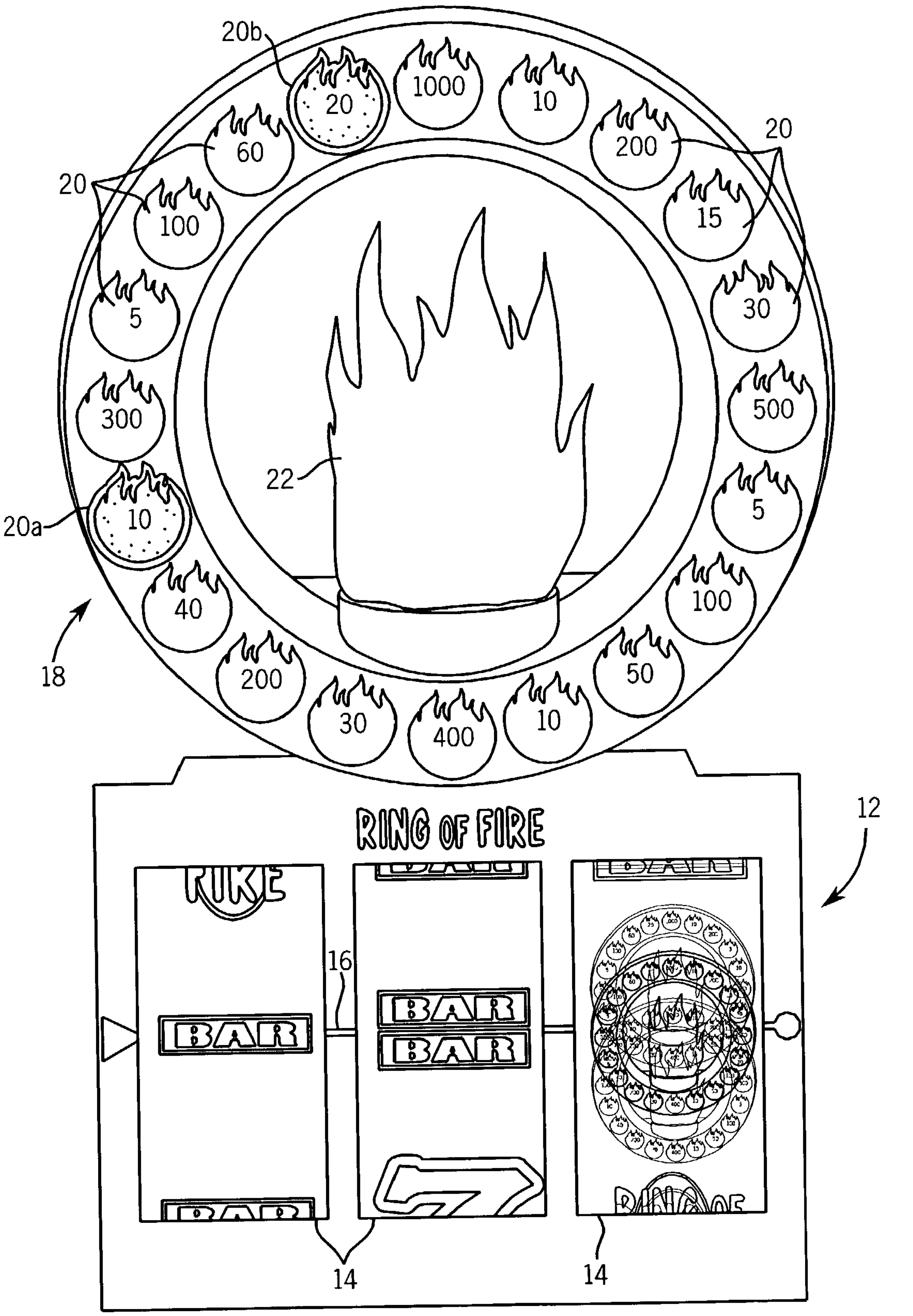
Figure 7:
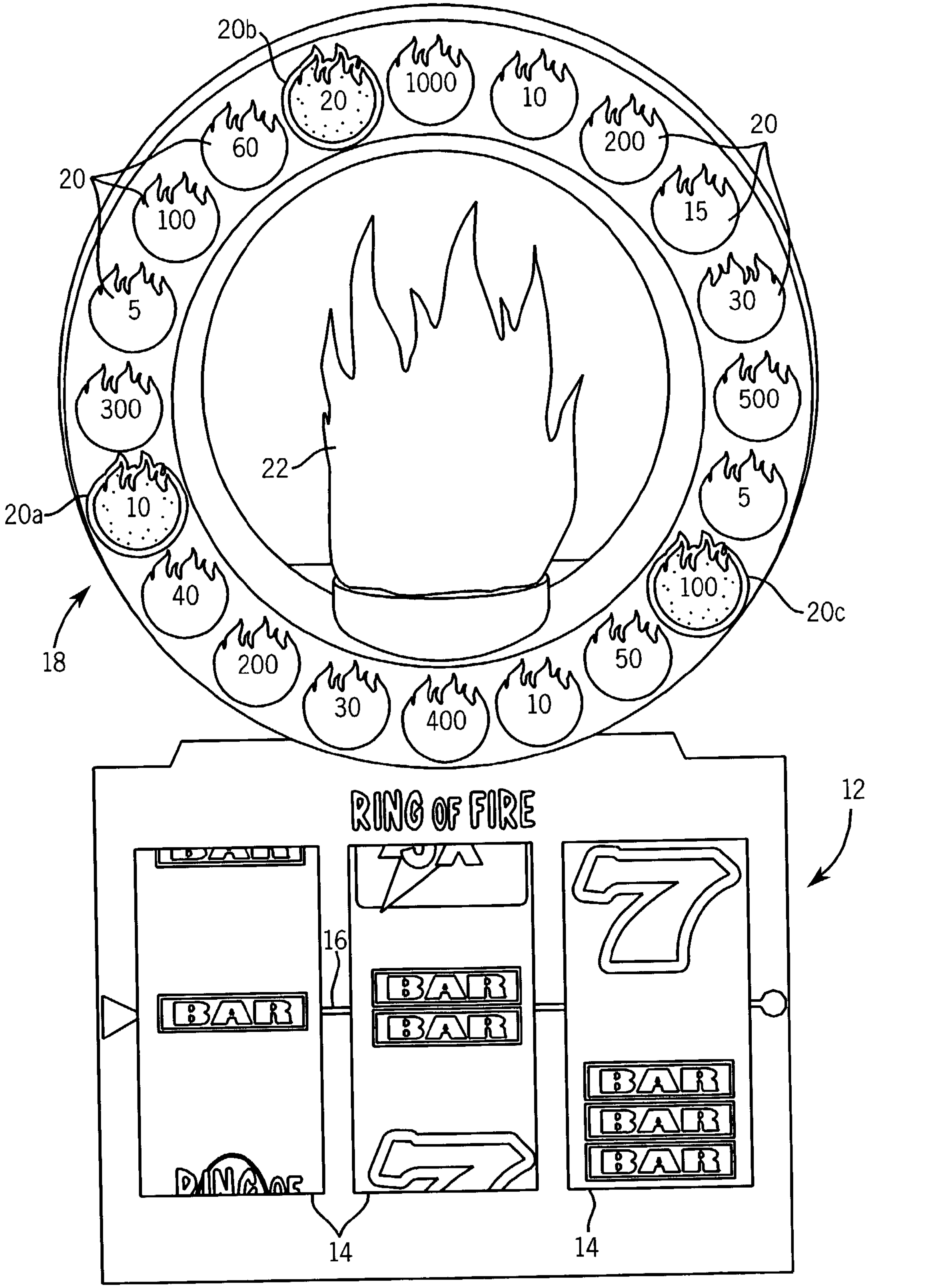

FIGS. 4, 5, 6, and 7 depict the operation of the synchronized display feature. Referring to FIG. 4, at the start of the synchronized display feature, the reel spinning display 12 rotates all three reels 14 as the secondary display 18 randomly illuminates (blinks) the possible bonus amounts 20 one at a time. Referring to FIG. 5, the leftmost one of the reels 14 stops. When the leftmost reel stops, the secondary display 18 simultaneously stops blinking and the bonus amount 20*a* that is illuminated at that moment (e.g., 10 credits) is awarded to the player. With the awarded bonus amount 20*a* staying lit, the secondary display 18 restarts the random illumination of the possible bonus amounts 20. Referring to FIG. 6, the middle one of the reels 14 stops. When the middle reel stops, the secondary display 18 simultaneously stops blinking and the bonus amount 20*b* that is illuminated at that moment (e.g., 20 credits) is awarded to the player. With the awarded bonus amounts 20*a* and 20*b* staying lit, the secondary display 18 restarts the random illumination of the possible bonus amounts 20. Referring to FIG. 7, the rightmost one of the reels 14 stops. When the rightmost reel stops, the secondary display 18 simultaneously stops blinking and the bonus amount 20*c* that is illuminated at that moment (e.g., 100 credits) is awarded to the player. Thus, in the illustrated example, the synchronized display feature awarded a total of 130 credits (i.e., 100+20+10=130 credits) to the player.

In addition to awarding the selected bonus amounts 20*a*, 20*b*, and 20*c* to the player, the synchronized display feature preferably awards additional bonuses if the stopped symbols along the pay line 16 form a winning combination. First, the feature credits the player an amount corresponding to the award in the pay table for that winning combination multiplied by the number of wagered credits. Second, the feature repeats the steps shown in FIGS. 4, 5, 6, and 7 and awards the bonus amounts illuminated on the secondary display 18 as each of the reels 14 successively stops. The synchronized display feature may continue to repeat itself each time a winning combination of symbols lands along the pay line 16. When no winning combination of symbols lands along the pay line 16, the CPU shifts operation from the synchronized display feature back to the basic slot game and requires a new wager from the player.

While the present invention has been described with reference to one or more particular embodiments, those skilled in the art will recognize that many changes may be made thereto without departing from the spirit and scope of the present invention. For example, instead of synchronizing the secondary display 18 with a reel spinning display 12, the secondary display 18 may be synchronized with the successive display of game elements other than sets of reel symbols. Such other game elements may, for example, includes playing cards of a poker game, keno numbers of a keno game, bingo numbers of a bingo game, etc. Furthermore, the bonus amounts 20 on the secondary display 18 may be replaced with other types of game elements such as symbols, shapes, or colors. The awarded bonus depends upon which of the game elements are displayed on the secondary display 18 in synchronization with the successive display of game elements on the main display 12. Each of these embodiments and obvious variations thereof is contemplated as falling within the spirit and scope of the claimed invention, which is set forth in the following claims.

What is claimed is:

1. A method of conducting a wagering game comprising:

receiving on a gaming machine a wager from a player;

conducting a basic game in response to receiving the wager; and triggering a secondary game in response to a start-bonus outcome in the basic game, the secondary game comprising:

successively displaying multiple sets of symbols in a primary display area as part of the secondary game, the multiple sets of symbols filling out a symbol array, each set of symbols being associated with a respective symbol bearing reel that is rotated and stopped to place the symbols on the reel in visual association with the display area; and syncronizing displaying of a plurality of secondary game credit outcomes in a secondary display area that is distinct from the primary display area, wherein at least one of the plurality of the secondary game credit outcomes is synchronized with the displaying of the multiple sets of symbols such that the displaying in the secondary display area includes displaying the respective secondary game credit outcomes as each respective reel is stopped.

2. The method of claim 1, wherein the respective secondary game credit outcomes include a bonus amount awarded to the player.

3. The method of claim 1, wherein the secondary display area includes a plurality of possible bonus amounts.

4. The method of claim 1, further including providing an award if the sets of symbols in the filled-out symbol array represent a winning outcome.

5. The method of claim 4, further including repeating the successively displaying step and the displaying in the secondary display area step if the sets of symbols in the filled-out symbol array represent a winning outcome.

6. The method of claim 1, wherein the reel is selected from a group consisting of a mechanical reel and a simulated video reel.

7. The method of claim 1, wherein the primary display area is a primary display and the secondary display area is a secondary display.

8. A method of conducting a wagering game comprising:

receiving on a gaming machine a wager from a player;

conducting a basic game in response to receiving the wager; and triggering a bonus game in response to a start-bonus outcome in the basic game, the bonus game comprising:

providing a spinning reel display area as part of the bonus game, the spinning reel display area including a plurality of symbol-bearing reels;

successively stopping rotation of the reels to display the symbols on each reel in visual association with the display area;

as each reel is stopped, synchronizing displaying a bonus credit in a secondary display area with the successive stopping rotation of the reels, the bonus credit being independent of the symbols on the reels, the secondary display area being distinct from the spinning reel display area; and awarding the player all displayed bonus credits after the reels are stopped.

9. The method of claim 8, wherein the reels are selected from a group consisting of mechanical reels and simulated video reels.

10. The method of claim 8, wherein the secondary display area includes a plurality of possible bonus amounts.

11. The method of claim 8, further including repeating the successively stopping step and the displaying step if the symbols displayed in the spinning reel display area represent a winning outcome.

12. The method of claim 8, wherein the spinning reel display area is a spinning reel display and the secondary display area is a secondary display.

13. A gaming machine for conducting a wagering game, comprising:

a wager input device configured to receive a wager from a player that initiates a basic game;

a spinning reel primary display area including a plurality of symbol-bearing reels, the primary display area configured to successively display multiple sets of symbols that fill out a symbol array as part of a bonus game that is initiated by a start-bonus outcome in the basic game, each set of symbols being associated with a respective one of the reels that is rotated and stopped to place the symbols on the reel in visual association with the display area; and a secondary display area configured to display a respective bonus game credit in synchronization with the displaying of each respective set of symbols in the primary display area, the secondary display area being distinct from the spinning reel primary display area;

wherein each respective bonus game credit is displayed in synchronizing in the secondary display area as a respective set of symbols is displayed in synchronization in the primary display area such that the respective bonus game credit has a random appearance relative to the respective set of symbols and such that the secondary display area displays the respective bonus game credit as the primary display area stops each respective reel.

14. The machine of claim 13, wherein the respective bonus game credit includes a bonus amount awarded to the player.

15. The machine of claim 13, wherein the secondary display area includes a plurality of possible bonus game amounts.

16. The machine of claim 13, further including a control system for providing an award if the sets of symbols in the filled-out symbol array represent a winning outcome.

17. The machine of claim 13, wherein the symbol-bearing reels are selected from a group consisting of mechanical reels and simulated video reels.

18. The machine of claim 13, wherein the spinning reel primary display area is a spinning reel primary display and the secondary display area is a secondary display.

19. A method of conducting a wagering game comprising:

receiving on a gaming machine a wager from a player;

conducting a basic game in response to receiving the wager;

triggering a secondary game in response to a start-bonus outcome in the basic game, the secondary game comprising:

successively displaying multiple primary game elements in a primary display area as part of the secondary game, the primary game elements including sets of reel symbols associated with respective symbol bearing reels that are rotated and stopped to place the reel symbols on the reel in visual association the display area;

synchronizing displaying of each set of reel symbols in the primary display area with displaying a respective secondary game credit in a secondary display area for the secondary game such that the displaying in the secondary display area includes displaying the respective secondary game credit in the secondary display area as the respective reel is stopped, the secondary display area being distinct from the primary display area; and awarding a payout to the player based on the secondary game credits displayed in the secondary display area.

20. The method of claim 19, wherein the primary display area is a primary display and the secondary display area is a secondary display.

* * * * *

UNITED STATES PATENT AND TRADEMARK OFFICE

CERTIFICATE OF CORRECTION

PATENT NO. : 7,614,949 B2
APPLICATION NO. : 10/205718
DATED : November 10, 2009
INVENTOR(S) : Peter R. Anderson and Joel R. Jaffe It is certified that error appears in the above-identified patent and that said Letters Patent is hereby corrected as shown below:

- Claim 1, Column 5, Line 36
  Correct spelling of "syncronizing" to read as "synchronizing"; and
- Claim 13, Column 6 Line 48-49
  Delete "in synchronizing".

Signed and Sealed this

Sixteenth Day of February, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,614,949 B2
APPLICATION NO. : 10/205718
DATED : November 10, 2009
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Nineteenth Day of October, 2010

David J. Kappos
*Director of the United States Patent and Trademark Office*